(12) United States Patent
Phillips

(10) Patent No.: US 11,303,797 B1
(45) Date of Patent: Apr. 12, 2022

(54) MINIATURIZED UNDERWATER CAMERA AND COMPUTER SYSTEM

(71) Applicant: University of Rhode Island Board of Trustees, Kingston, RI (US)

(72) Inventor: Brennan T. Phillips, Wakefield, RI (US)

(73) Assignee: University of Rhode Island Board of Trustees, Kingston, RI (US)

( * ) Notice: Subject to any disclaimer, the term of this patent is extended or adjusted under 35 U.S.C. 154(b) by 0 days.

(21) Appl. No.: 16/920,577

(22) Filed: Jul. 3, 2020

Related U.S. Application Data

(60) Provisional application No. 62/870,561, filed on Jul. 3, 2019.

(51) Int. Cl.

| | |
|---|---|
| *B62B 9/14* | (2006.01) |
| *A47D 13/02* | (2006.01) |
| *A47D 15/00* | (2006.01) |
| *H04N 5/232* | (2006.01) |
| *G03B 17/08* | (2021.01) |
| *H04N 5/225* | (2006.01) |

(52) U.S. Cl.
CPC ......... *H04N 5/23203* (2013.01); *G03B 17/08* (2013.01); *H04N 5/2252* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| 8,330,854 | B2 | 12/2012 | Kossin | |
| 9,661,745 | B1* | 5/2017 | Yazzie | H05K 1/0271 |
| 2002/0003584 | A1* | 1/2002 | Kossin | H04N 5/2252 |
| | | | | 348/373 |
| 2008/0238345 | A1* | 10/2008 | Jaan | H05B 47/155 |
| | | | | 315/325 |
| 2014/0151105 | A1* | 6/2014 | Kuwahara | H03H 9/1021 |
| | | | | 174/260 |
| 2014/0291886 | A1* | 10/2014 | Mark | B29C 64/209 |
| | | | | 264/163 |
| 2018/0352121 | A1* | 12/2018 | Chapman | H04N 5/2252 |

OTHER PUBLICATIONS

"GoPro Hero4 Session User Manual," pp. 1-105. (Year: 2015).*

(Continued)

*Primary Examiner* — Christopher Braniff
(74) *Attorney, Agent, or Firm* — Peacock Law P.C.; Philip D. Askenazy

(57) ABSTRACT

A deep-sea imaging and control system with an extremely compact remote camera head unit which can operate to depths of at least 5500 m (about 8500 psi). The unit has a photopolymer shell for a pressure housing that can be 3D-printed, at least partially filled with high performance epoxy used as a potting compound. A pressure resistant optically transparent material such as a flat polished borosilicate glass disc serves as the optical viewport and protects the unpotted lens assembly from pressure and water intrusion. The control computer can be separate from the camera, is partially or completely potted in epoxy, and can be accessible through a Wi-Fi connection.

17 Claims, 9 Drawing Sheets
(7 of 9 Drawing Sheet(s) Filed in Color)

(56) References Cited

OTHER PUBLICATIONS

"GoPro Launches Hero4 Session: The Smallest, Lightest and Most Convenient GoPro, Yet," The Inside Line, Jul. 6, 2015. (Year: 2015).*

Bingham, N., "Designing pressure-tolerant electronic systems", Unmanned Underwater Technology, White Paper., 2013.

Calambokidis, J., et al., "Insights into the underwater diving, feeding, and calling behavior of blue whales from a suction-cup-attached video-imaging tag (CRITTERCAM)", Marine Technology Society Journal, 41(4), 2007, 19-29.

CATS, "CATS Cam—Customized Animal Tracking Solutions", www.cats.is/products/cats-cam, 2020.

CATS, "CATS-Cam Wireless Multi Sensor-controlled HD Cam Data Sheet", CASTS-Cam v.3.1.0., 2017.

Cazenave, F., et al., "SeeStar: a low-cost, modular and open-source camera system for subsea observations.", 2014 Oceans-St John's, 2014.

Crystal Cam Imaging, Inc., "Crystal Cam Amber Fact Sheet", www.crystalcam.ca, 2016.

Goldbogen, J.A., et al., "Using digital tags with integrated video and inertial sensors to study moving morphology and associated function in large aquatic vertebrates", The Anatomical Record, 300(11), 2017, 1935-1941.

Little Leonardo Co., "Video logger", http://l-leo.com/eng/video-logger, 2019.

Marshall, G., "An advanced solid-state animal-borne video and environmental data-logging device ("Crittercam") for marine research", Marine Technology Society Journal, 41(2), 2007, 31-38.

Raspberry Pi Foundation, "Raspberry Pi Camera Module Documentation", https://www.raspberrypi.org/documentation/hardware/camera/, 2019.

Rosen, H., et al., "Chromogenic behaviors of the Humboldt squid (*Dosidicus gigas*) studied in situ with an animal-borne video package", Journal of Experimental Biology, 218(2), 2015, 265-275.

* cited by examiner

MINIATURIZED UNDERWATER CAMERA AND COMPUTER SYSTEM

CROSS-REFERENCE TO RELATED APPLICATIONS

This application claims priority to and the benefit of the filing of U.S. Provisional Patent Application No. 62/870,561, entitled "Miniaturized Underwater Camera and Computer System", filed on Jul. 3, 2019, the specification, claims, and drawings of which are incorporated herein by reference.

BACKGROUND OF THE INVENTION

Field of the Invention (Technical Field)

The present invention is related to a ruggedized, robust, low-cost, pressure-tolerant underwater camera and computer system that is particularly suitable for deep-sea imaging.

BACKGROUND ART

Note that the following discussion may refer to a number of publications and references. Discussion of such publications herein is given for more complete background of the scientific principles and is not to be construed as an admission that such publications are prior art for patentability determination purposes.

Imaging systems, either live or recorded, are essential components to almost every underwater instrument platform and vehicle, including remotely operated vehicles (ROVs), autonomous underwater vehicles (AUVs), manned submersibles, ocean observatories, and baited remote underwater video systems (BRUVs). Tethered ROVs often incorporate six or more cameras from different viewpoints, while power and payload restrictions often limit autonomous systems to single-camera arrangements. Deep-sea cameras are traditionally expensive components and, due to the need to maintain digital camera optics (sensor and lens assembly) in a 1-atmosphere dry environment, all existing deep-sea cameras are almost exclusively housed in one-atmosphere pressure housings made of aluminum, stainless steel or titanium, combined with custom-made flat or hemispherical optical viewports. Such housings are costly to fabricate and are large compared to the camera itself. As a result, deep-sea cameras are expensive, bulky components of underwater vehicles and remote systems; this is particularly true for HD- and higher-resolution cameras. These restrictions limit the capability, system inventory, and deployment opportunities available to a growing community of marine roboticists and ocean scientists. For example, in autonomous recording systems such as BRUVs and biologging animal tags, camera size and form factor directly influences the physical design of the entire system and limits the operational endurance.

SUMMARY OF THE INVENTION (DISCLOSURE OF THE INVENTION)

An embodiment of the present invention is a camera system for underwater use, the camera system comprising a camera module comprising a camera module shell, a camera printed circuit board (PCB) potted in epoxy, a camera lens disposed outside the epoxy, and a viewport sealing the camera lens from the environment; a separate computer module comprising a computer module shell, a computer PCB potted in epoxy, and a wireless communications device; and an electrical connector connecting the camera module and the separate computer module. The camera module is preferably approximately a cube having a volume of approximately one cubic inch. The camera module shell and/or the computer module shell preferably comprises a rigid 3D-printed photopolymer resin. A portion of the camera module shell on an opposite side of the camera module PCB from the viewport is preferably a thickened, solid layer of the material used to form the camera module shell. The camera lens is preferably disposed in a one-atmosphere cavity which is preferably sealed by the viewport. The camera lens is preferably mounted on the camera PCB. The camera system preferably comprises a Raspberry Pi camera module capable of producing 8 MP still images and high definition (HD) 1080p30 video. The camera module preferably comprises an internal chamfer to control epoxy potting of the camera PCB. The viewport preferably comprises a polished borosilicate glass disc. The camera system preferably comprises a Raspberry Pi processor. Oscillators on the computer PCB are preferably surface reinforced with epoxy. The camera system preferably comprises a battery in a pressure housing, one or more potted lights, and/or one or more buoyancy devices, and is preferably operable to a depth of approximately 5500 m and/or a pressure of approximately 8500 psi. The camera system preferably comprises a converter for converting a wireless signal produced by the wireless communication device to a hardwired ethernet signal and/or a fiber optic signal. The electrical connector preferably comprises a waterproofed ribbon cable and can be up to approximately two meters in length.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the figures:

FIG. 5A: Dogfish shark (*Mustelus canis insularis*); FIG. 5B: cutthroat eel (Synaphobranchidae family); FIG. 5C: Sixgill shark (*Hexanchus griseus*).

DETAILED DESCRIPTION OF EMBODIMENTS OF THE INVENTION

Figure 1:
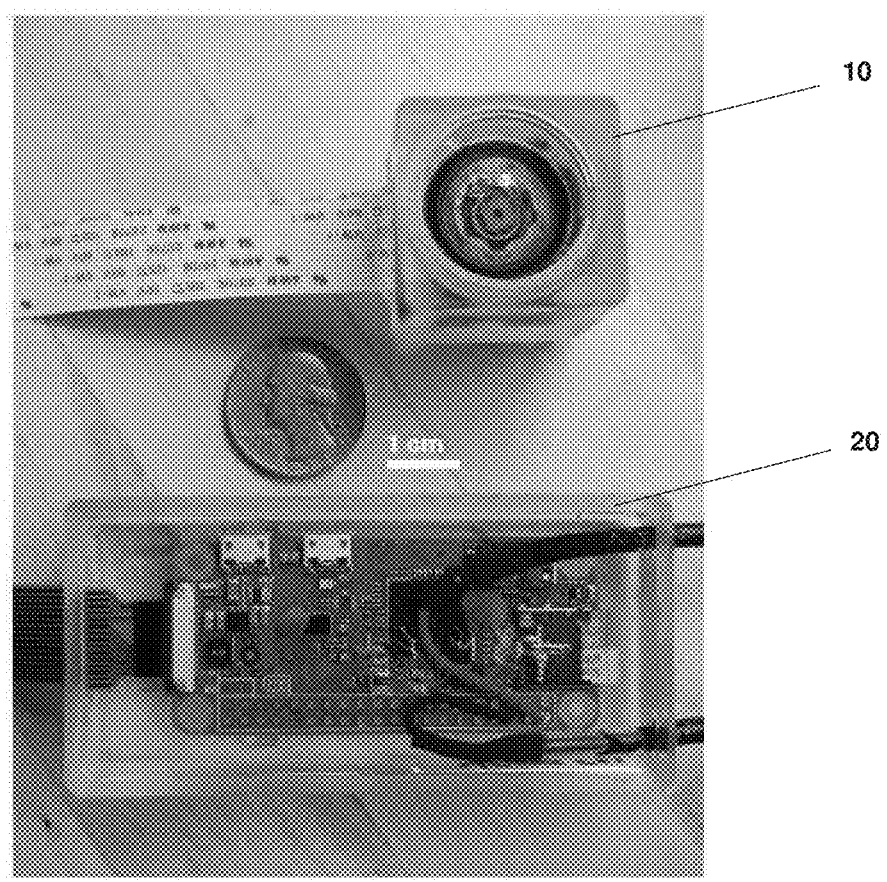
FIG. 1 is a photograph of an embodiment of the camera system of the present invention, including a remote camera head or module (top) and an epoxy-potted Raspberry Pi Zero W computer module (bottom).

Embodiments of the present invention are a deep-sea camera and computer system. The system can comprise a commercially available 8-megapixel still image/high definition (HD) video digital cellphone-style camera, which is included in a remote camera head or module that can be as small as about one cubic inch and is at least partially filled with epoxy as a potting compound, preferably up to the level of the camera lens. The circuit board beneath the camera sensor is preferably fully potted while the optical assembly is preferably disposed in a small, dry volume at one atmosphere. The internal geometry of the 3D-printed shell preferably guides the level of epoxy potting inside the housing, allowing for the lens assembly to remain in an air-filled volume, which retains the native optical performance of the camera and allows for focus adjustment. A viewport comprising a polished borosilicate glass disc is preferably sealed with an o-ring held in a 3D-printed o-ring groove to protect that small volume from pressure and water intrusion. The control system is preferably based on the Raspberry Pi family of single-board computers. The materials for the system can cost about $70 (depending on options such as SD card size), which can be further reduced when produced in quantity, in contrast to thousands of dollars for existing deep-sea cameras. The small form factor and Linux-based control computer enables deep-sea imaging systems of the present invention that produce multiple camera views (stereo, 3D, etc.).

Recent advances in commercially available 3D printing, specifically stereolithography-based (SLA) printing systems utilizing photopolymer resin, offer the advantage of creating completely solid parts in high resolution. This technology enables rapid prototyping of marine-relevant design features such as o-ring seals, ribbon-cable passthroughs, and complex internal geometries. The imaging system of the present invention preferably leverages these capabilities by housing a miniature board-mounted camera inside a 3D printed shell that is designed to guide assembly and the exact placement of epoxy-filling. The SLA-printed shell has the added benefit of reinforcing the entire assembly with a material that is of a higher tensile strength, tensile modulus, and flexural modulus than most rigid urethane epoxy materials, enabling an increased depth/pressure rating. The simple viewport design enables quick and easy access for lens focusing, and the entire housing design is easily incorporated into larger geometries such as fairings, mounts, and multi-camera arrays. Aside from the 3D printer itself, no heavy shop machinery (lathe, mill, etc.) is necessary to fabricate systems of the present invention, making them an economically viable deep-sea instrument design particularly appropriate for research and educational purposes. This is further enabled by the global open-source community using Raspberry Pi for technology development.

Given the widespread use of cameras in underwater vehicles and robotics, cameras of the present invention have many envisioned commercial applications. Some key examples include use on AUVs, where several of these cameras could be integrated to the outside of the vehicle without taking up much physical space. Similarly, ROVs can use these cameras to provide multiple points of view, including on the ends of manipulator systems, inside/adjacent to sampling equipment, and stereo image mapping systems. Small, size-optimized deep-sea platforms such as "drop camera" systems would also benefit from this technology. In shallow water (<1000 m), this camera design can be treated as a ruggedized, robust solution for harsh environments including applications involving port security, fisheries observing, and biologging/animal tag applications.

The camera of the present invention is the smallest form factor HD deep-sea camera system available today. As a remote unit, the camera can be located up to 2 m away from the control computer allowing for a wide range of mounting configurations. The camera can also be physically combined with the control computer into a single unit. Embodiments of the present invention have the benefits of the Raspberry Pi open source architecture for user development, including full user configurability, along with wireless programming, live-stream video capability, and potential expansion into time-synced multi-camera arrays. The 3D-printed shell along with precisely controlled epoxy-filled volumes enables the camera to be used at substantial depth ratings, which can be further increased through printing with various materials as they are made available to the commercial market, including rigid photopolymers and metals such as aluminum, stainless steel, and titanium. The camera design can easily be scaled to accommodate other 'cellphone'-style camera modules. The present invention can be used onboard ROVs, AUVs, BRUVs and other deep-sea platforms, and a wide range of applications are envisioned for the scientific, education, defense, and commercial sectors.

Example 3D printed components were created using a Formlabs Form 2 SLA-based printer using Formlabs' standard methacrylic clear resin, which were washed in >90% isopropyl alcohol and post-cured using the Form Cure unit according to manufacturer specifications. Epoxy potting was accomplished using Crystal Clear™ 202 (Smooth-On), injected into 3D-printed shells using plastic syringes, and de-bubbled using a standard vacuum/pressure chamber process. All epoxy-filled parts were left to cure for at least 5 days at ~20 C prior to pressure testing. External sealing of ribbon cable and power cable pass-throughs was made using either silicone adhesive glue or hot-melt glue. Ribbon cables were waterproofed using Scotchkast™ 2131 flame retardant electrical insulating resin (3M). A photograph of remote camera module 10 and epoxy-potted computer module 20 is pictured in FIG. 1A.

Figure 2:
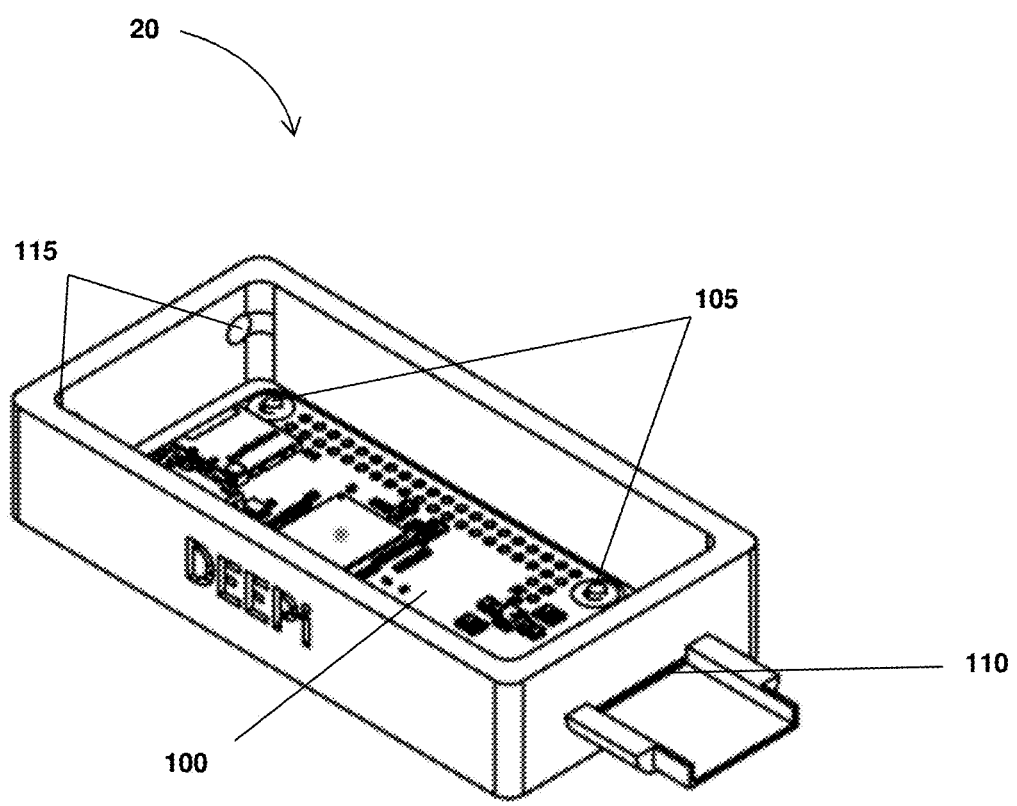
FIG. 2 shows a potted computer module of the present invention.

The Raspberry Pi Zero W was chosen to control the camera module due to its extremely compact form factor, ability to run a full Linux operating system, wi-fi connectivity, and low cost. The Zero W is based on a Broadcom BCM2835 ARM processor and includes an array of surface-mount components, including two quartz oscillators. The oscillators are the only known components on the board to contain an air void, and so prior to epoxy-potting the entire computer, the oscillators were surface reinforced using a high-strength epoxy (J-B Weld 8272 MarineWeld). As shown in FIG. 2, computer module 20 comprised a single 3D-printed shell which was used to mount Raspberry Pi Zero W computer printed circuit board (PCB) 100 on four PCB board mounts 105 (two not pictured). The shell was approximately 4.3×1.8×0.7 in and comprised ribbon-cable pass-through 110. Using an extended CSI-style ribbon cable, the camera unit can be placed the length of the cable (e.g. up to two meters) away from the controller or control computer module. The ribbon cable and CSI extender module were waterproofed using cable insulating resin that is poured directly over the cable on a flat surface, and excess was cut off using a razor blade. Power for the computer (5 VDC) was provided through two single-conductor waterproof cables via one or more power cable pass-throughs 115.

The camera was based on the Raspberry Pi Camera Module v2, which is capable of capturing 8MP still images and 1080p30 video with a field of view of 62.2 degrees. Although other camera systems could be used, this camera module was chosen due to its high resolution, small form factor, low cost, and extensive inventory of open-source control software and documentation available for Raspberry Pi systems. The Camera Module v2 comprises a Sony IMX219PQ image sensor and lens assembly, which is mounted on a PCB containing several solid-state electronic components such as MOSFET arrays, linear and switching voltage regulators, common mode chokes, and an authentication IC chip. Aside from the image sensor and lens assembly, all of these components are considered viable for pressure-tolerant underwater packaging.

Figure 3A:
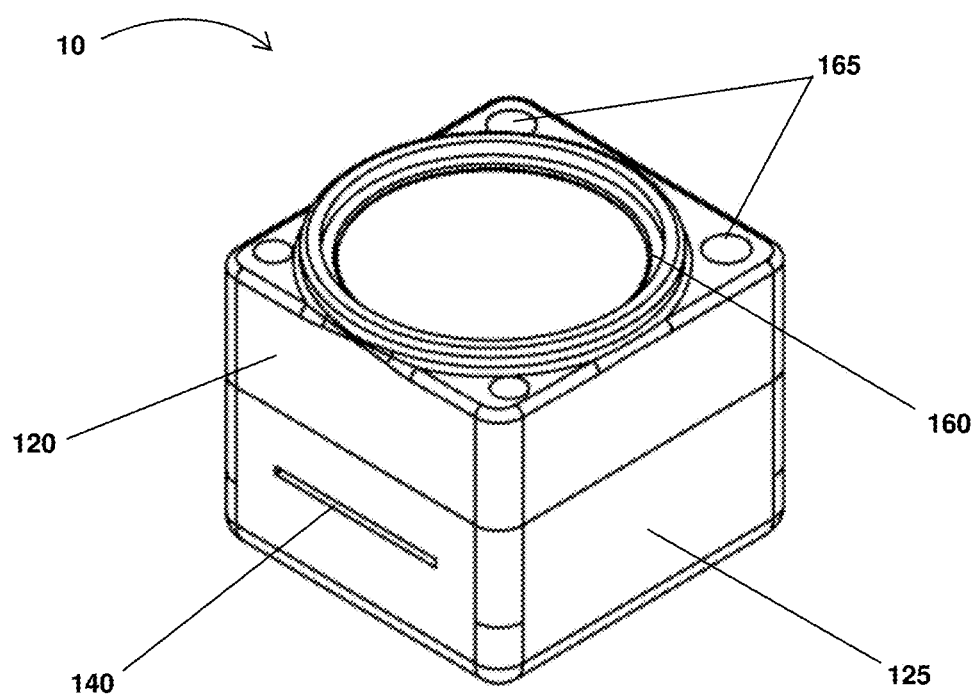
FIG. 3A is a perspective view of a camera module of the present invention.
Figure 3B:
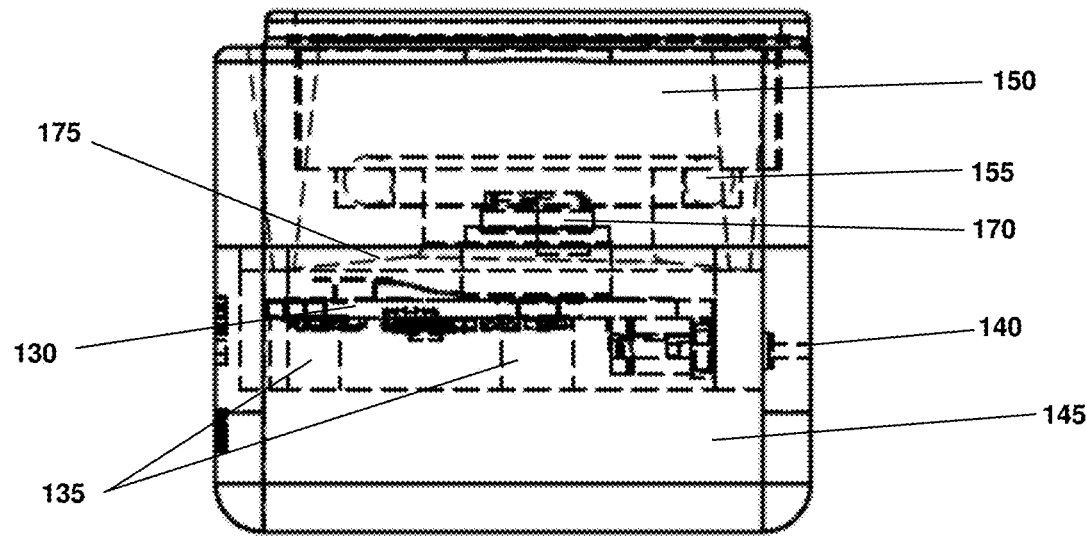
FIG. 3B is a cross sectional side view of the camera module of FIG. 3A.
Figure 3C:
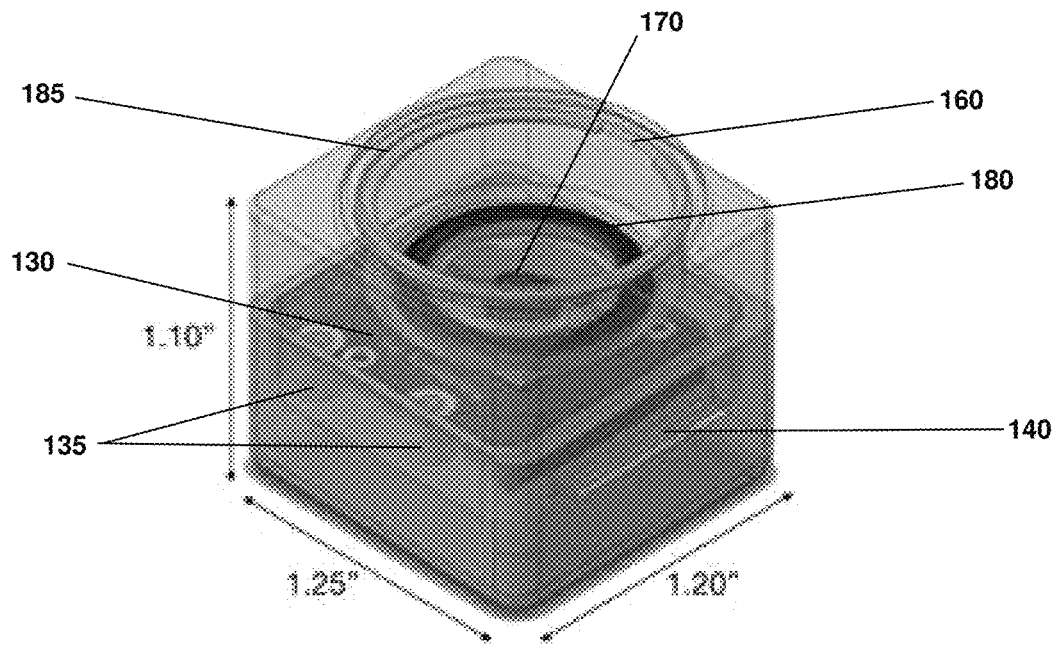
FIG. 3C is a transparent perspective view of the camera module of FIG. 3A after assembly.
Figure 3D:
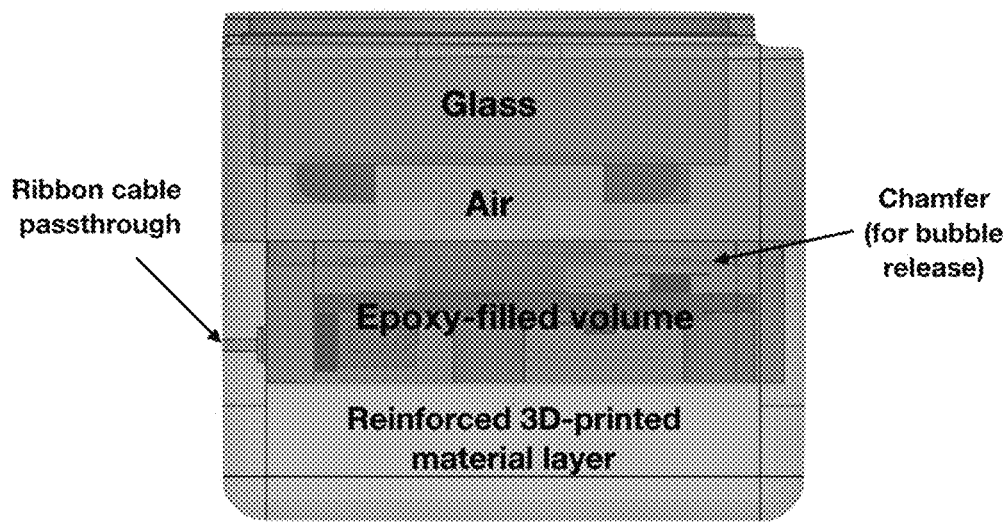
FIG. 3D is a side view of the camera module of FIG. 3A showing the epoxy-filled volume in relation to the 3D-printed shell and glass viewport.

The Camera Module v2 was mounted inside 3D-printed camera shell 10 comprising two halves 120, 125 as shown in FIGS. 3A-3D. The lower half mounted camera PCB board 130 on camera PCB board mounts 135 and comprised ribbon-cable pass-through 140, which was dimensioned slightly larger than the ribbon cable itself. The base of lower half 125 was thickened to form a reinforced 3D-printed material layer 145 to increase the pressure tolerance of the unit beyond what is possible by epoxy potting alone. Upper half 120 comprised viewport mount 150, o-ring groove 155, retaining ring groove 160, and epoxy injection points 165. Internal dimensions of the shell assembly were designed to visually guide epoxy filling on a level surface, so that the viewport and o-ring seal are supported underneath with filled material while lens assembly 170 remains dry in air and accessible for focusing, as shown in FIG. 3D. The epoxy-filled volume preferably fuses camera shell halves 120, 125 into a single unit. Internal chamfer 175 was also included to allow any remaining bubbles in the epoxy to float towards the viewport rim, where they can be released. The viewport chosen for the camera unit was a 1" diameter, ¼" thick polished borosilicate disk, sealed using o-ring 180 (standard Buna-N Dash No. 115), and pre-loaded under light external pressure using a single-turn stainless streel spiral internal retaining ring, such as circlip capture ring 185.

The built-in Wi-Fi modem on the Zero W allows for 'headless' control of the computer via SSH or remote desktop connection using a static IP address and a dedicated Wi-Fi network. Custom Python scripts were written to allow remote streaming of imagery from each control computer, as well as to initiate/terminate recording events. During recording, files were divided into 12-minute segments and stored in internal memory. Following each field deployment, recorded video was downloaded using standard FTP protocol.

The camera system was laboratory tested for functionality and physical resistance to implosion to a maximum of 8500 psi/5500 m depth. The pressure testing was conducted using a custom small-volume high pressure hydraulic pressure test chamber located at the University of Rhode Island. Cameras were assessed for functionality before, during, and after testing to determine survival and performance, while potted Raspberry Pi computers were powered on and communicating via SSH and/or RealVNC® Remote Desktop throughout pressure cycling.

Figure 4:
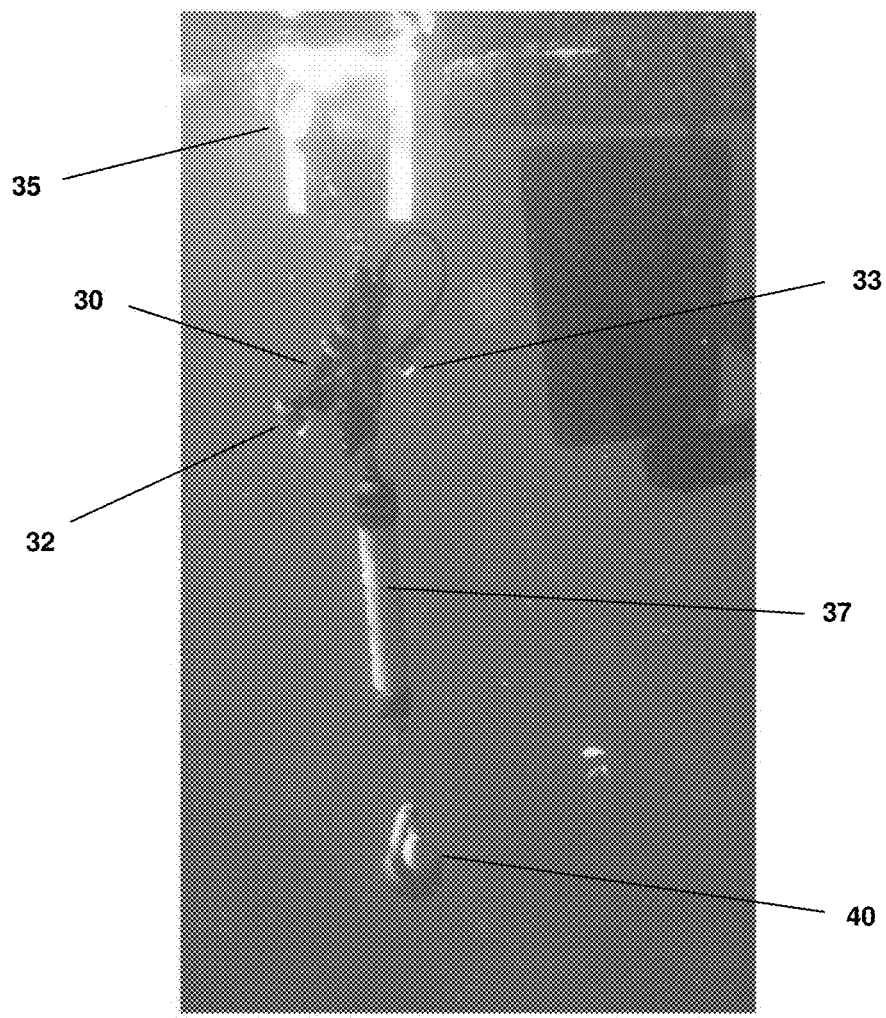
FIG. 4 is a photograph of a BRUV system used to deploy a camera system of the present invention in Bermuda.
Figure 5A:
FIGS. 5A-5C are image stills from HD video recorded at 700-1100 m deep in Bermuda using a camera system of the present invention.
Figure 5B:
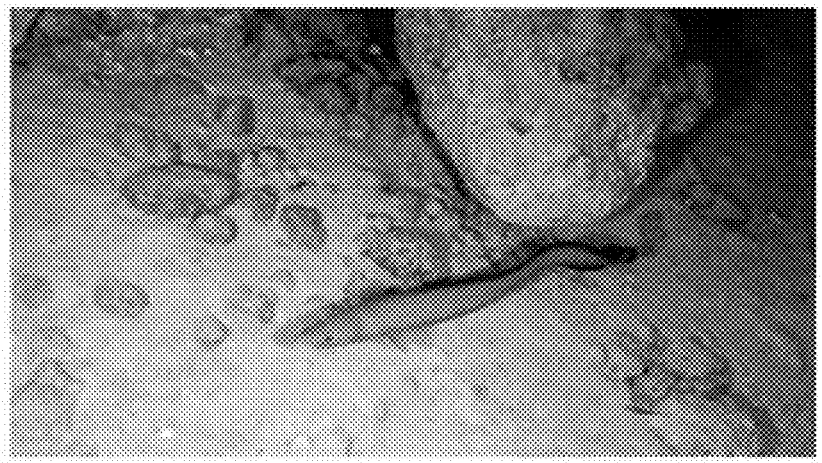
Figure 5C:
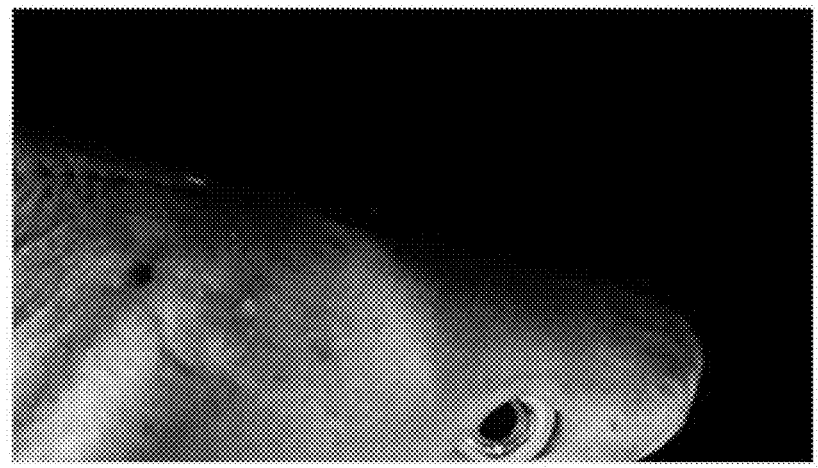

Since laboratory testing, field tests were conducted in deep water south of Bermuda, in collaboration with the Bermuda Institute of Ocean Sciences (BIOS). Several deep water field deployments of the cameras have taken place. In March 2019 two deployments were conducted in deep water off the Northeast coast of Bermuda. FIG. 4 is a photograph of a BRUV system used to deploy a camera system of the present invention. A camera system of the present invention, comprising two cameras and control computers, was attached to free-falling BRUV lander system 30 equipped with a Li-ion battery pack in a pressure housing, two potted LED lights 32, 33 (SiteLite, Juice Robotics, USA), a depth/temperature logger (DST centi-TD, Star-Oddi, Iceland), acoustic release system 37 (Edgetech, USA). BRUV lander system 30 was connected to flotation sphere 35 and drop weight 40. During the first deployment to 715 m depth (ambient temperature 10.8 C) both cameras recorded video for approximately 2 hours at depth. During the second deployment to 1096 m depth (ambient temperature 5.3 C) the cameras recorded successfully for approximately 6 hours at depth. As shown in the still images of FIGS. 5A-5C, the BRUVs recorded HD video of several deep-sea fish species including dogfish sharks, a cutthroat eel, and sixgill sharks.

Figure 6A:
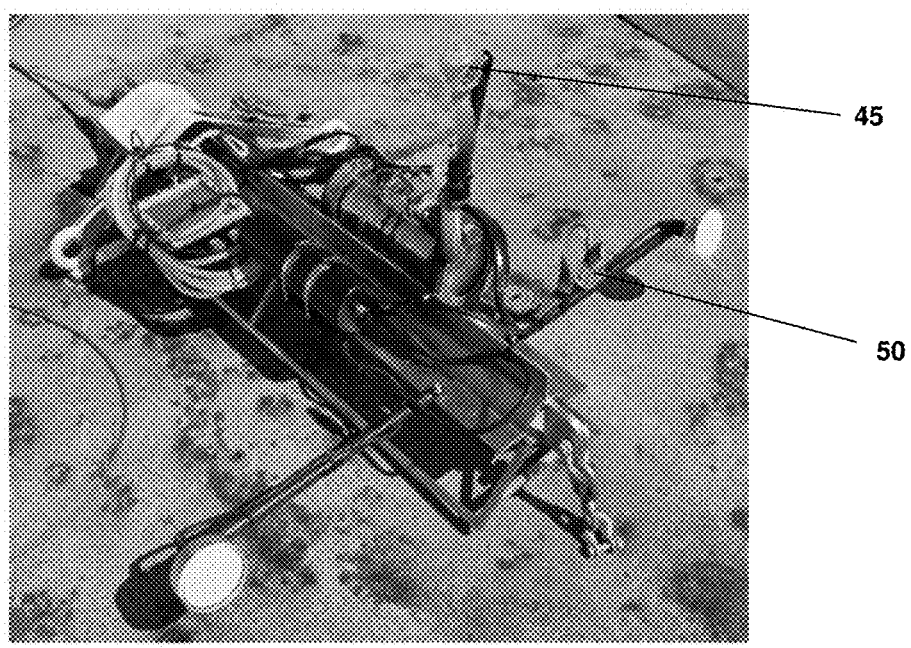
FIG. 6A shows two camera systems installed on a custom seafloor sampling system with live fiber-optic telemetry to the surface prior to deployment, used to collect biological samples from a depth of about 400 m in Baltimore Canyon, USA.
Figure 6B:
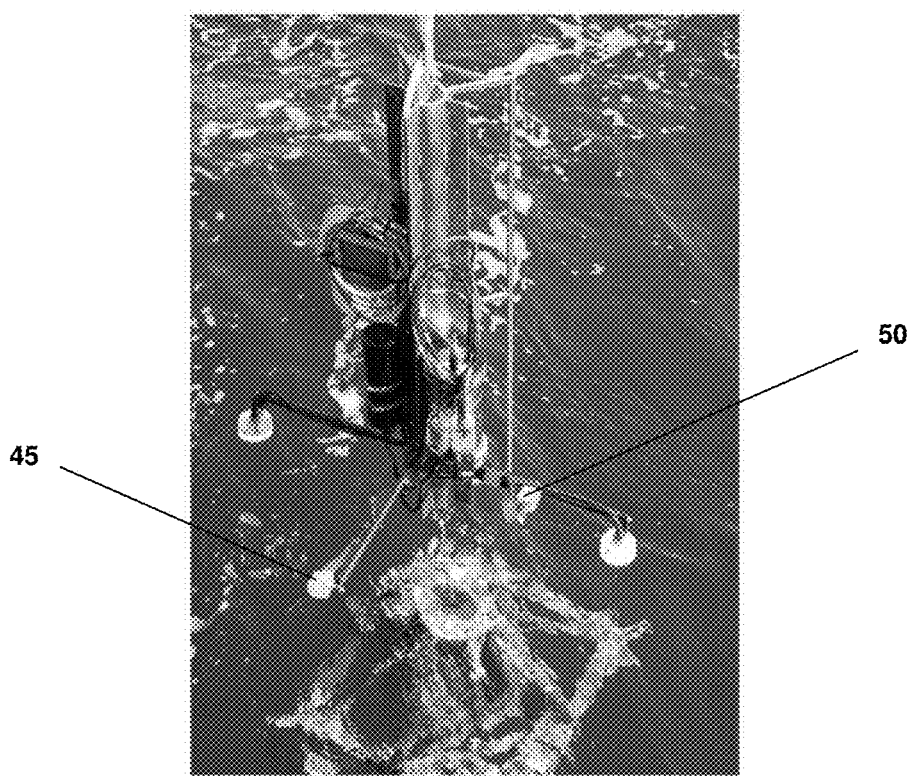
FIG. 6B shows the sampling system of FIG. 6A during deployment.

In September 2019 several deployments were conducted to about 400 m in Baltimore Canyon, USA as part of a scientific research expedition to collect biological samples of chemosynthetic mussels that surround methane seeps. Three cameras of the present invention were powered by a lithium-ion battery pack in a 1-atmosphere housing and connected with live telemetry to the surface using a Wi-Fi router and a local wireless ethernet connection converted into a fiber-optic signal which was transmitted using an oceanographic cable and winch system. FIGS. 6A and 6B are photographs showing two of the camera systems of the present invention 45, 50 installed on the custom seafloor sampling system before and during deployment, respectively.

Figure 7A:
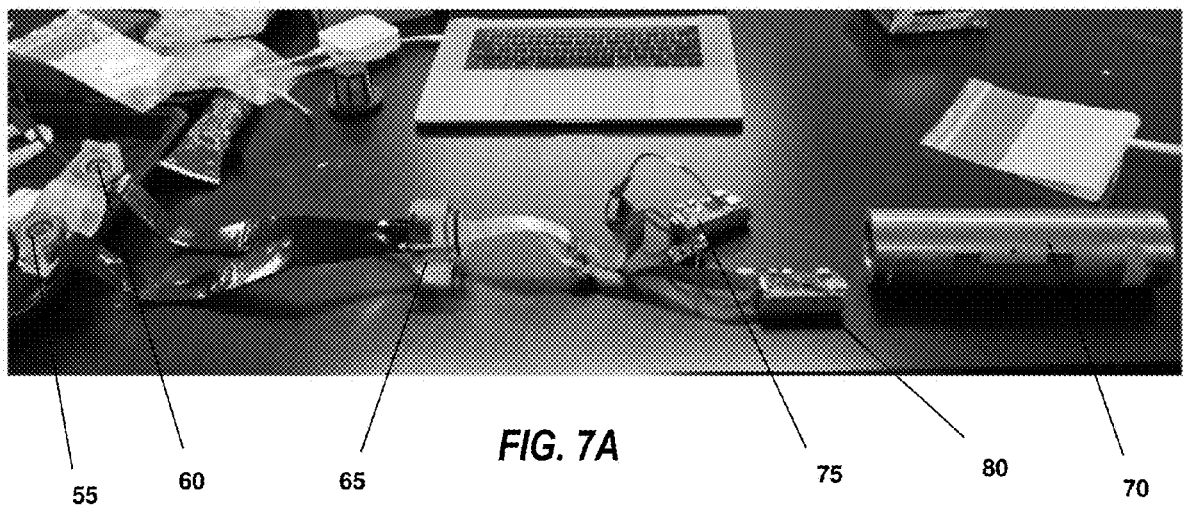
FIG. 7A shows an exploded view of a camera system of the present invention comprising two cameras.
Figure 7B:
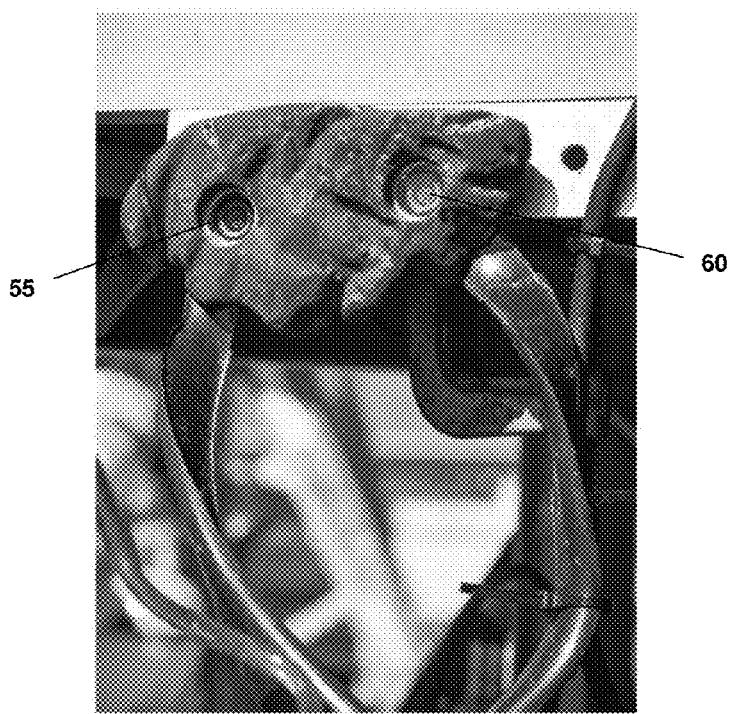
FIG. 7B shows the two cameras of the camera system of FIG. 7A installed on a work-class ROV system, used to collect live imagery from −1400 m depth off the West coast of Oahu, Hi.

In October 2019 several deployments were conducted to about 1400 m off the west coast of Oahu, Hi., USA onboard the research ROV "SuBastian". The cameras were powered by the ROV and live telemetry to the surface was achieved with a local wireless connection converted to a hardwired ethernet network on the ROV. FIG. 7A is an exploded view of the camera system used, comprising two camera heads 55, 60, bulkhead 65 with ribbon cable pass-throughs, pressure housing 70 containing two Raspberry Pi computer modules 75, 80 with batteries. FIG. 7B shows the camera system installed on a work-class ROV system.

Figure 8:
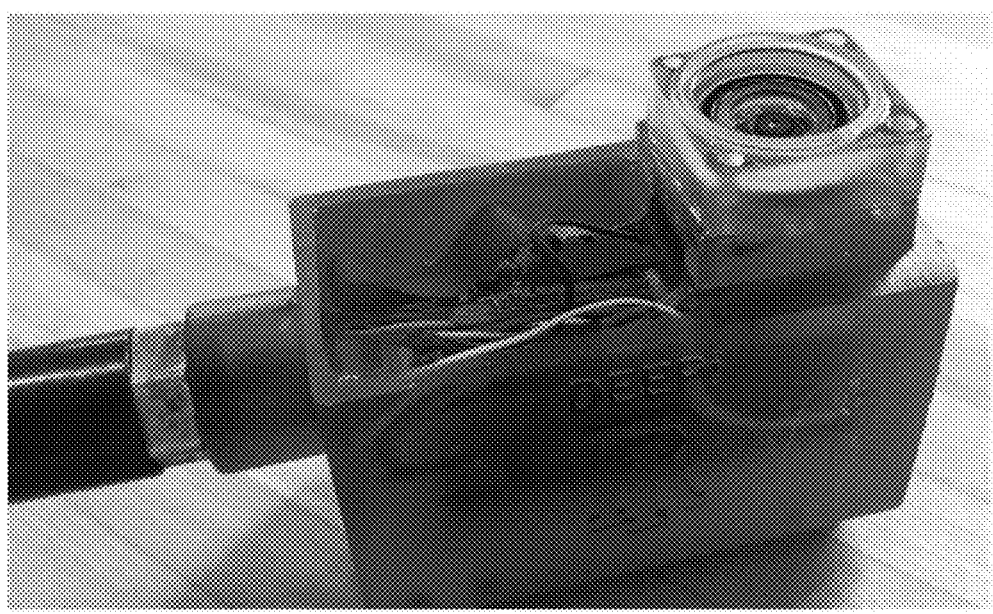
FIG. 8 shows a prototype camera system of the present invention with an integrated rechargeable battery, used to collect recorded imagery from −3300 m depth off Barbados.

In February 2020 a new self-powered rechargeable variant of a camera system of the present invention was sent to about 3300 m depth on a CTD rosette near Barbados in the Atlantic Ocean. Video was retrieved post-deployment, showing that the system successfully recorded video to the maximum depth. FIG. 8 shows a camera system of the present invention comprising an integrated rechargeable battery, which was used to collect the recorded imagery.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A camera system for underwater use, the camera system comprising:
   (a) a camera module comprising:
      a camera module shell;
      a camera printed circuit board (PCB) potted in epoxy;
      a camera lens comprising a surface for receiving light, at least a portion of which surface is disposed in an air cavity outside said epoxy; and
      a viewport in said camera module shell sealing said air cavity from the environment;
   (b) a computer module comprising a computer PCB potted in epoxy and a wireless communications device; and
   (c) an electrical connector connecting said camera module and said computer module.

2. The camera system of claim 1 wherein said camera module is approximately a cube having a volume of approximately one cubic inch.

3. The camera system of claim 1 wherein said camera module shell and/or said computer module shell comprises a rigid 3D-printed photopolymer resin.

4. The camera system of claim 1 wherein a portion of said camera module shell on an opposite side of said camera module PCB from said viewport is a thickened, solid layer of material used to form said camera module shell.

5. The camera system of claim 1 wherein said air cavity comprises a pressure of one atmosphere.

6. The camera system of claim 1 wherein said camera lens is mounted on said camera PCB.

7. The camera system of claim 1 wherein the camera system comprises a single board computer camera module capable of producing 8 megapixels (MP) still images and high definition (HD) 1080p30 video.

8. The camera system of claim 1 wherein said camera module comprises an internal chamfer to control epoxy potting of said camera PCB.

9. The camera system of claim 1 wherein said viewport comprises a polished borosilicate glass disc.

10. The camera system of claim 1 comprising a single board computer processor.

11. The camera system of claim 1 wherein oscillators on said computer PCB are surface reinforced with epoxy.

12. The camera system of claim 1 comprising a battery in a pressure housing, one or more potted lights, and/or one or more buoyancy devices.

13. The camera system of claim 1 operable to depth of approximately 5500 m and/or a pressure of approximately 8500 psi.

14. The camera system of claim 1 comprising a converter for converting a wireless signal produced by said wireless communication device to a hardwired ethernet signal and/or a fiber optic signal.

15. The camera system of claim 1 wherein said electrical connector comprises a waterproofed ribbon cable.

16. The camera system of claim 1 wherein said electrical connector is up to approximately two meters in length.

17. The camera system of claim 1 wherein said computer module comprises a separate computer module shell.

* * * * *